(12) United States Patent
Friauf et al.

(10) Patent No.: US 8,006,049 B2
(45) Date of Patent: Aug. 23, 2011

(54) EXPORT OF LOGICAL VOLUMES BY POOLS

(75) Inventors: Cheryl M. Friauf, Tucson, AZ (US);
Gregory T. Kishi, Oro Valley, AZ (US);
Mark A. Norman, Tucson, AZ (US);
Laura J. Ostasiewski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 11/624,556

(22) Filed: Jan. 18, 2007

(65) Prior Publication Data

US 2008/0177960 A1  Jul. 24, 2008

(51) Int. Cl.
G06F 12/00 (2006.01)
(52) U.S. Cl. ........................................................ 711/159
(58) Field of Classification Search ................... 711/159
See application file for complete search history.

(56) References Cited

U.S. PATENT DOCUMENTS

| 6,718,427 | B1 | 4/2004 | Carlson et al. | |
|---|---|---|---|---|
| 6,816,941 | B1 | 11/2004 | Carlson et al. | |
| 7,047,390 | B2 * | 5/2006 | Factor et al. | 711/162 |
| 2005/0262326 | A1 * | 11/2005 | Carlson et al. | 711/170 |
| 2007/0266213 | A1 * | 11/2007 | Ushijima et al. | 711/162 |

* cited by examiner

*Primary Examiner* — Midys Rojas
(74) *Attorney, Agent, or Firm* — Rabindranath Dutta; Konrad Raynes & Victor LLP (57) ABSTRACT

A virtual tape server for implementing a method for exporting one or more logical volumes contained in a source physical volume pool. The method involves an activation of an export clone pool to clone an identity of the source physical volume pool into the export clone pool based on the logical volumes, an exportation of the export clone pool including the logical volumes subsequent to the activation of the export clone pool, and a deactivation of the export clone pool to purge the identity of the source physical volume pool from the export clone pool subsequent to the exportation of the export clone pool.

21 Claims, 9 Drawing Sheets

EXPORT FLOWCHART 120

S122: ACTIVATE EXPORT CLONE POOL 170 TO CLONE AN IDENTITY OF SOURCE PHYSICAL VOLUME POOL 160 INTO EXPORT CLONE POOL 170
*(FIG. 6)*

1. COPY POOL RULES 161
2. MOVE LOGICAL VOLUMES OF PHYSICAL VOLUMES V21-24 TO EXPORT CLONE POOL 170
   A. INDIVIDUALLY MOVE THE LOGICAL VOLUMES RLV OF PHYSICAL VOLUMES V21-V24 TO EXPORT CLONE POOL 170 AND/OR
   B. MOVE PHYSICAL VOLUMES V21-V24 TO EXPORT CLONE POOL 170
      (1) REMOVE ANY SUPERFLUOUS LOGICAL VOLUME SLV1 PRIOR TO MOVING PHYSICAL VOLUMES V21-V24 TO EXPORT CLONE POOL 170
      (2) RETURN ANY SUPERFLUOUS LOGICAL VOLUME SLV2 SUBSEQUENT TO MOVING PHYSICAL VOLUMES V21-V24 TO EXPORT CLONE POOL 170
3. MOVE SCRATCH VOLUMES V05 AND V06 TO EXPORT CLONE POOL 170

S124: EXECUTE AN EXPORTATION OF EXPORT CLONE POOL 70
*(FIG. 7 & 8)*

1. SELECTIVELY WRITE CACHED DATA TO SOURCE PHYSICAL VOLUME POOL 160 AND EXPORT CLONE POOL 170
2. MARK PHYSICAL VOLUMES V21-V24 AS FULL
3. UPDATE TABLE OF CONTENTS OF PHYSICAL VOLUMES 21-24
4. EXPORT PHYSICAL VOLUMES V21-V24 OF EXPORT CLONE POOL 70

S126: DEACTIVATE EXPORT CLONE POOL 170 TO PURGE THE IDENTITY OF SOURCE PHYSICAL VOLUME POOL 160 FROM EXPORT CLONE POOL 170
*(FIG. 9)*

1. DELETE POOL RULES 171
2. RETURN ANY EXPORT FAILED PHYSICAL VOLUME (E.G., V24)

EXPORT OF LOGICAL VOLUMES BY POOLS

FIELD OF THE INVENTION

The present invention generally relates to data storage and processing, and in particular to virtual storage systems. The present invention specifically relates to a method and system for efficiently exporting removable storage volumes from a virtual storage system.

BACKGROUND OF THE INVENTION

In hierarchical virtual storage systems, intensively used and frequently accessed data is stored in fast but expensive memory. One example of a fast memory is a direct access storage device ("DASD"). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

One such hierarchical storage system is a virtual tape storage system ("VTS") including a host data interface, a DASD, and a number of tape devices. When the host writes a logical volume, or a file, to the VTS, the data is stored as a file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume is then appended onto a tape cartridge, or a physical volume, with the original left on the DASD for possible cache hits. When a DASD file has been appended to a tape cartridge and the original remains on the DASD, the file is "premigrated."

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

Typically, a database containing information that links the logical volumes to their corresponding physical tape volume is maintained by the VTS. Generally, the database is maintained and backed up separately from the data tapes. From time to time, the data tapes may need to be exported from a source VTS to a target VTS. Currently, exportation of the data tapes requires a copying of all of the data from all source tapes in the source VTS to all target tapes of the target VTS, which is inefficient in terms of data processing power and time. In fact, in would be more efficient just to output all of the source tapes from the source VTS as the target tapes for the target VTS, but this can be impractical in terms of the continued operation of the source VTS.

Accordingly, what is needed in the art is an improved method for exporting data tapes from a source VTS to a target VTS that mitigates the above-discussed limitations in the prior art. More particularly, what is needed in the art is an improved method for exporting data tapes that allows a continued host usage of the source tapes during a period the source tapes are being data copied from a remote cluster.

SUMMARY OF THE INVENTION

The present invention provides a new and unique export of logical volumes by pools.

A first form of the present invention is a computer bearing medium tangibly embodying a program of machine-readable instructions executable by a processor to perform operations for exporting one or more logical volumes contained in a source physical volume pool. The operations comprise an activation of an export clone pool to clone an identity of the source physical volume pool into the export clone pool based on the logical volumes, an exportation of the export clone pool including the at least one logical volume subsequent to the activation of the export clone pool, and a deactivation of the export clone pool to purge the identity of the source physical volume pool from the export clone pool subsequent to the exportation of the export clone pool.

A second form of the present invention is a virtual tape server comprising a processor, and a memory storing instructions operable with the processor for exporting one or more logical volumes contained in a source physical volume pool. The instructions are executed for activating an export clone pool to clone an identity of the source physical volume pool into the export clone pool based on the logical volumes, for exporting the export clone pool including the at least one logical volume subsequent to the activation of the export clone pool, and for deactivating the export clone pool to purge the identity of the source physical volume pool from the export clone pool subsequent to the exportation of the export clone pool.

A third form of the present invention is a method for exporting one or more logical volumes contained in a source physical volume pool. The method comprises an activation of an export clone pool to clone an identity of the source physical volume pool into the export clone pool based on the logical volumes, an exportation of the export clone pool including the at least one logical volume subsequent to the activation of the export clone pool, and a deactivation of the export clone pool to purge the identity of the source physical volume pool from the export clone pool subsequent to the exportation of the export clone pool.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
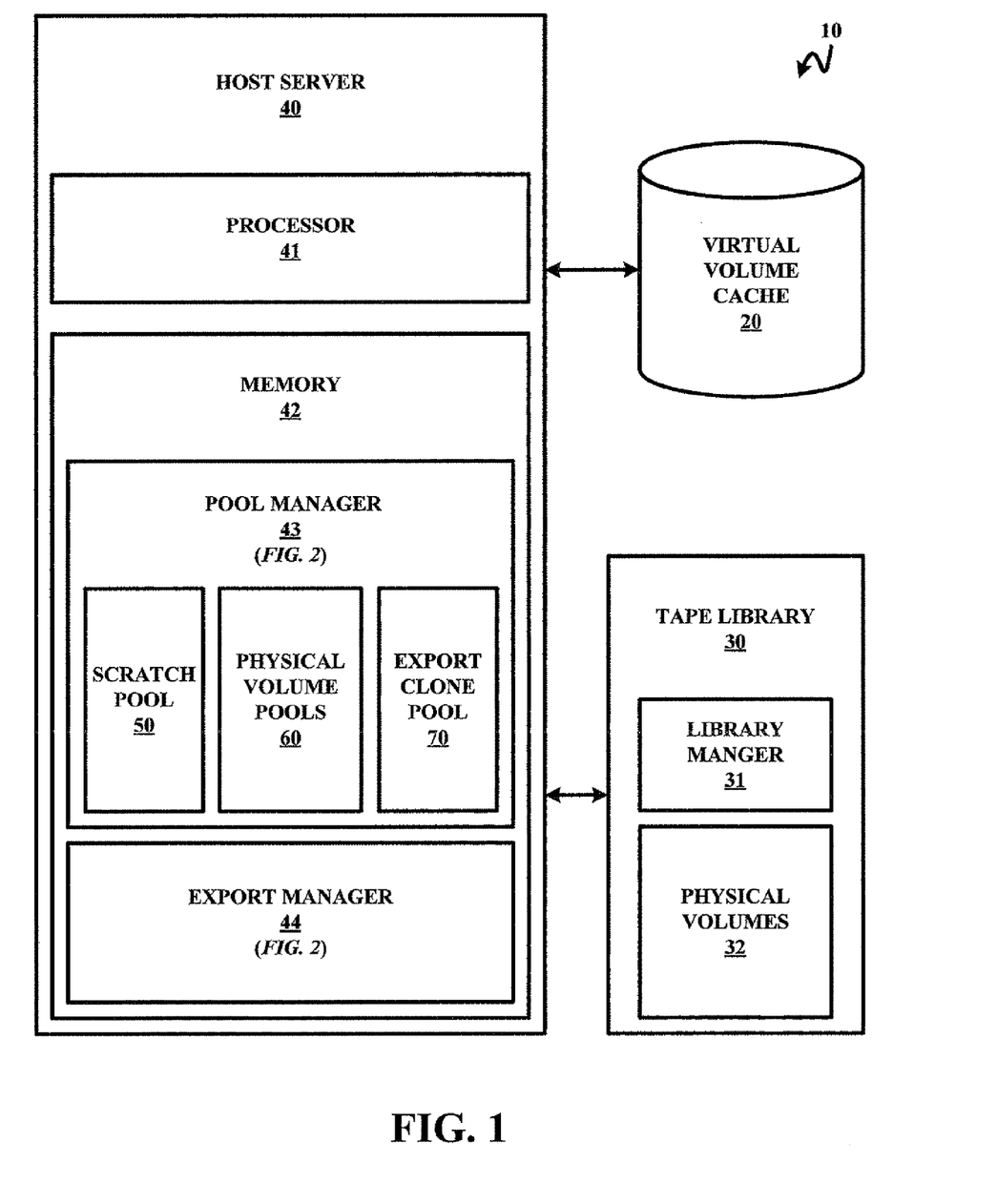
FIG. 1 illustrates a basic embodiment of a virtual tape server in accordance with the present invention.

FIG. 1 illustrates a virtual tape system 10 employing a virtual volume cache 20, a tape library 30 having a library manager 31 for managing a plurality of physical volumes 32 stored on tapes therein, and a host server 40 for facilitating a host (not shown) in initiating and running host jobs for writing and copying physical volumes 32 as known in the art. The present invention addresses a host job directed to an export of logical volumes (not shown) mapped to one or more physical volumes 32. To this end, host server 40 employs a processor 41 and a memory 42 for supporting a pool manager 43 and an export manager 44.

Pool manager 43 is structurally configured to establish and maintain a scratch pool 50 of scratch volumes and one or more physical volume pools 60 containing logical volumes stored on physical volumes 32 (e.g., tape) as known in the art. As would be appreciated by those having ordinary skill in the art, each physical volume pool 60 typically has an X number of pool rules, where $X \geq 1$, and a mapping of a Y number of logical volumes to a Z number of physical volumes, where $Y \geq Z \geq 1$.

Figure 2:
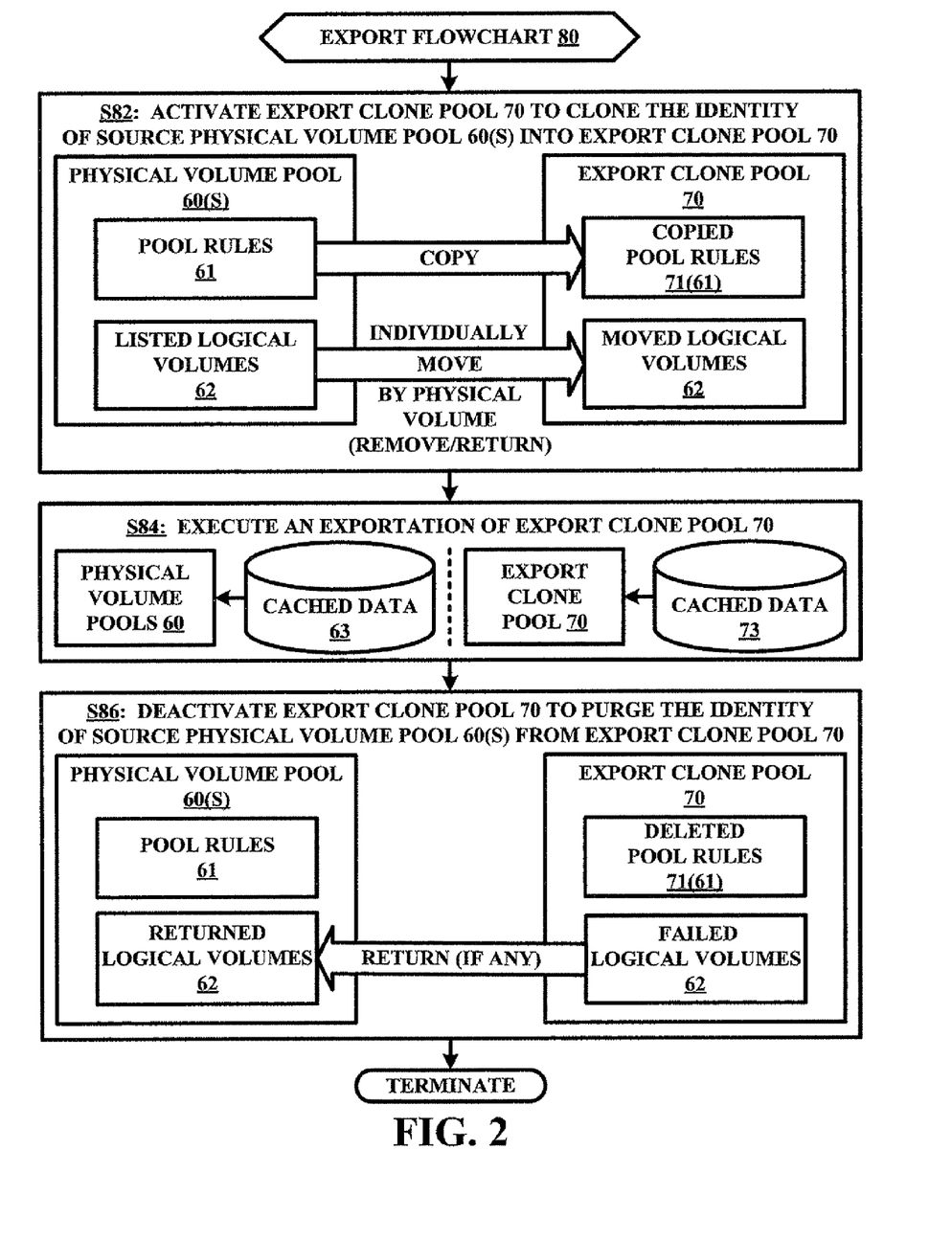
FIG. 2 illustrates a flowchart representative of a basic embodiment of a logical volume export method in accordance with the present invention.

Pool manager 43 is further structurally configured to manage an activation of an export clone pool 70 of the present invention for facilitating an efficient export of logical volumes contained within physical volume pools 60 as requested by a host job in accordance with a logical volume export method of the present invention as will be exemplarily described herein in connection with FIG. 2. When export clone pool 70 has been activated for export by pool manager 43, export manager 44 is structurally configured for executing an exportation of the logical volumes contained within physical volume pools 60 as requested by the host job in accordance with the logical volume export method of the present invention.

Specifically, FIG. 2 illustrates a flowchart 80 representative of the logical volume export method of the present invention that is initiated by pool manager 43 in response to a host job requesting an export of logical volumes 62 contained with a source physical volume pool 60(S) among physical volume pools 60. A stage S82 of flowchart 80 encompasses pool manager 43 activating export clone pool 70 to clone an identity of the source physical volume pool 60(S) into export clone pool 70. For example, as shown in stage S82, pool manager 43 copies each pool rule 61 of source physical volume pool 60(S) as pool rules 71 (61) of export clone pool 70. In one embodiment, pool rules 61 include information necessary for the management of the functioning interconnection between logical volumes 62 and corresponding physical volumes contained in source physical volume pool 60(S), such as, for example, the type of tapes being used and data borrowing/return policies.

Additionally, as also shown in stage S82, pool manager 43 moves each logical volume 62 of source physical volume pool 60(S) into export clone pool 70. In one embodiment, the host job provides a listing of logical volumes 62 on an explicit basis and/or a physical volume basis whereby the movement of logical volumes 62 from source physical volume pool 60(S) to export clone pool 70 is based on the listing of logical volumes 62 in view of a snapshot of source physical volume pool 60(S) at the time of export request by the host job. Specifically, the movement of logical volumes 62 from source physical volume pool 60(S) to export clone pool 70 can be accomplished by a selective use of two (2) procedures that is based on the physical volume location of logical volumes 62 within source physical volume pool 60(S) as established by the snapshot of source physical volume pool 60(S) at the time of export request by the host job.

The first procedure involves pool manager 43 executing a recall of an individual logical volume 62 from a physical volume of source physical volume pool 60(S) to cache 20 (FIG. 1) whereby the recalled individual logical volume 62 is premigrated from cache 20 to a physical volume of export clone pool 70 (e.g., a scratch volume of export clone pool 70). While this first procedure can be used for any reason, it is primarily appropriate to use this first procedure in response to the individual logical volume 62 being explicitly listed by the host job and being contained within a physical volume containing a non-zero number of the listed logical volumes 62 where the physical volume has a size or a quantity that is less than a predefined size threshold or a predefined quantity threshold, respectively, as indicated by the snapshot of source physical volume pool 60(S).

The second procedure involves pool manager 43 executing a database operation for moving a physical volume of source physical volume pool 60(s) to export clone pool 70 where the moved physical volume a non-zero number of the listed logical volumes 62. While this second procedure can also be used for any reason, it is primarily appropriate to use this second procedure in response to the physical volume being explicitly listed by the host job and/or the physical volume containing a non-zero number of the listed logical volumes 62 where the physical volume has a size or a quantity that is greater than a predefined size threshold or a predefined quantity threshold, respectively, as indicated by the snapshot of source physical volume pool 60(S).

In either case, any movement of the physical volume can further involve a removal of any superfluous logical volume of the physical volume (i.e., a logical volume contained with the physical volume that is not being requested by the host job) prior to moving the physical volume to export clone pool 70. The removal can be accomplished by a recall of each superfluous logical volume of the physical volume from source physical volume pool 60(S) to cache 20 whereby each recalled superfluous logical volume is premigrated back to source physical volume pool 60(S).

Alternatively, any movement of the physical volume can further involve a return of any superfluous logical volume of the physical volume subsequent to moving the physical volume from source physical volume pool 60(S) to export clone pool 70. The return can be accomplished by a recall of each superfluous logical volume of the physical volume from export clone pool 70 to cache 20 whereby each recalled superfluous logical volume is premigrated back to source physical volume pool 60(S).

Upon a complete activation of export clone pool 70, a stage S84 of flowchart 80 encompasses export manager 44 executing an exportation of export clone pool 70 in accordance with the host job. The exportation of export clone pool 70 includes known exporting acts by export manager 44 that are omitted from description herein. The portion of the exportation of export clone pool 70 relevant to the present invention involves a pre-export phase of stage S84. Specifically, subsequent to the activation of export clone pool 70 by pool manager 30 as shown in stage S84, export manager 44 writes data 73 residing in cache 20 (FIG. 1) to export clone pool 70 that was cached prior to the database snapshot of source physical volume pool(S) 60 and is associated with the cloned logical volumes 62. Furthermore, as shown in stage S84, export manager 44 facilitates a writing of data 63 residing in cache 20 to physical volume pool 60 subsequent to the database snapshoot of source physical volume pool 60(S).

Upon completing the cache data write to logical volume 62 within export clone pool 70, export manager 44 writes a table of contents at the end of each physical volume of export control pool 70 that contains any number of logical volumes 62. The table of contents for each physical volume preferably includes information describing the contents of the physical volume and may include information describing a set of physical volumes.

Upon completing the writing of the table of contents, export manager 44 completes the exporting of the physical volumes of export clone pool 70 corresponding to logical volumes 62. Thereafter, during a stage S86 of flowchart 80, pool manager 43 deactivates export clone pool 70 to purge the identity of source physical volume pool 60(S) from export clone pool 70. In one embodiment, as shown in stage S86, pool rules 71 (61) are deleted from export clone pool 70 and any logical volume 62 that failed to be exported is returned to source physical volume pool 60(S) by a database movement of a corresponding physical volume from export clone pool 70 to source physical volume pool 60(S).

In practice, the present invention does not impose any limitations or any restrictions to the structural configuration of virtual tape server 10 as shown in FIG. 1 or any deviation thereof. To facilitate a further understanding of the present invention, an exemplary embodiment of virtual tape server 10 will now be described herein in connection with FIG. 3.

Figure 3:
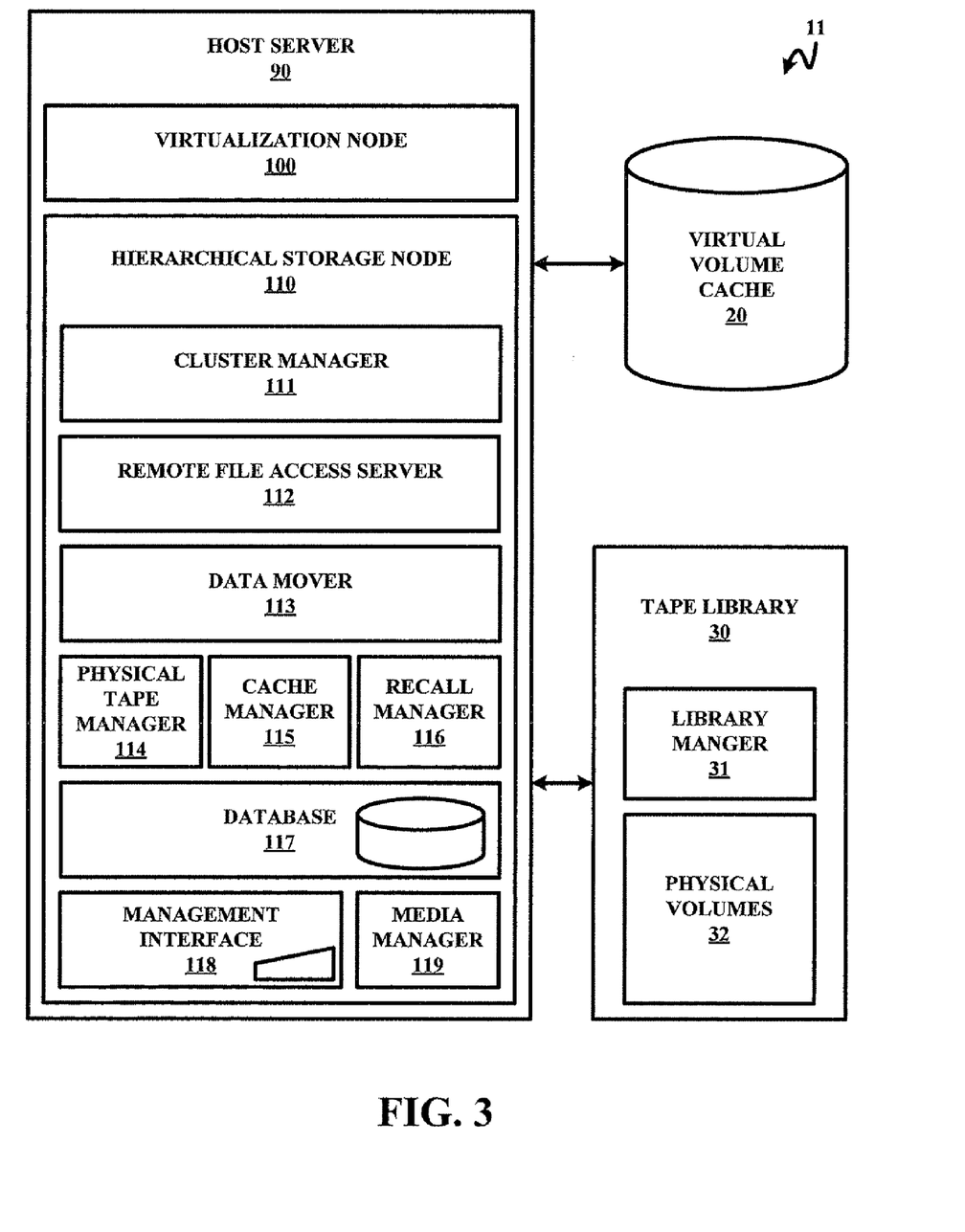
FIG. 3 illustrates an exemplary embodiment of the virtual tape server illustrated in FIG. 1 in accordance with the present invention.

Referring to FIG. 3, an exemplary virtual tape server 11 employs virtual volume cache 20 (FIG. 1), tape library (FIG. 1), and a host server 90 including a virtualization node 100 and a hierarchical storage node 110 having a cluster manager 111, a remote file access server 112, a data mover 113, a physical tape manager 114, a cache manager 115, a recall manager 116, a database 117, a management interface 118 and a media manager 119.

Virtualization node 100 includes tape daemons (not shown) emulating a tape drive (e.g., IBM 3490 tape drive) to a host (not shown). In one embodiment, virtualization node 100 operates on a file that is either on cache 20 or operates on a remote cluster's cache (not shown) through remote file access server 112. Cluster manager 111 coordinates operations between clusters via tokens that are stored in each cluster's database 117 to determine which cluster has a current copy of data and coordinates coping of data between clusters.

Remote file access server 112 provides a link to cache 20 by an remote cluster. Data mover 113 controls the actual data transfer operations for copies performed between clusters and transfers of data between cache 20 and library 30. Physical tape manager 114 manages physical tapes in library 30 in multiple physical volume pools, controls reclamation, borrows/returns volumes from a scratch pool, and controls movement of tapes between pools. Cache manager 115 controls a copying of data between cache 20 to library 30 and any subsequent removal of a redundant copy of data in cache 20, and provides control signals to balance data flow between cache 20 and other node 110 components. Recall manager queues and controls recalls of data into cache 20 from library 30 on behalf of virtualization node 100 or cluster manager 111.

Management interface 118 provide information about server 11 and allows a user control and configuration of system 11. Media manager 119 manages the handling of physical tapes and error recovery, and diagnoses errors and determines if the errors were caused by a physical tape drive or a physical tape media to thereby take appropriate action.

Figure 4:
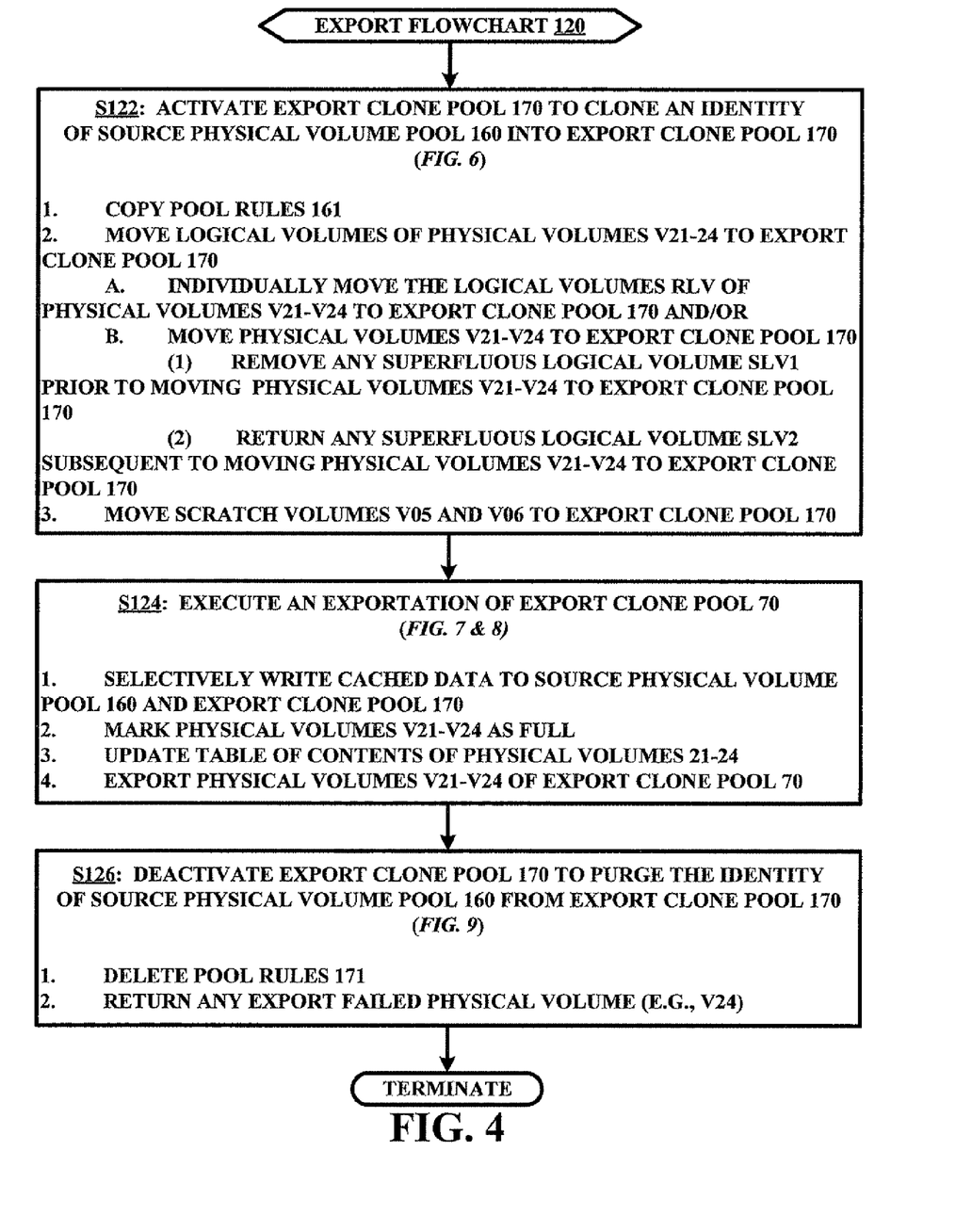
FIG. 4 illustrates a flowchart representative of an exemplary embodiment the logical volume export method illustrated in FIG. 2 in accordance with the present invention.
Figure 5:
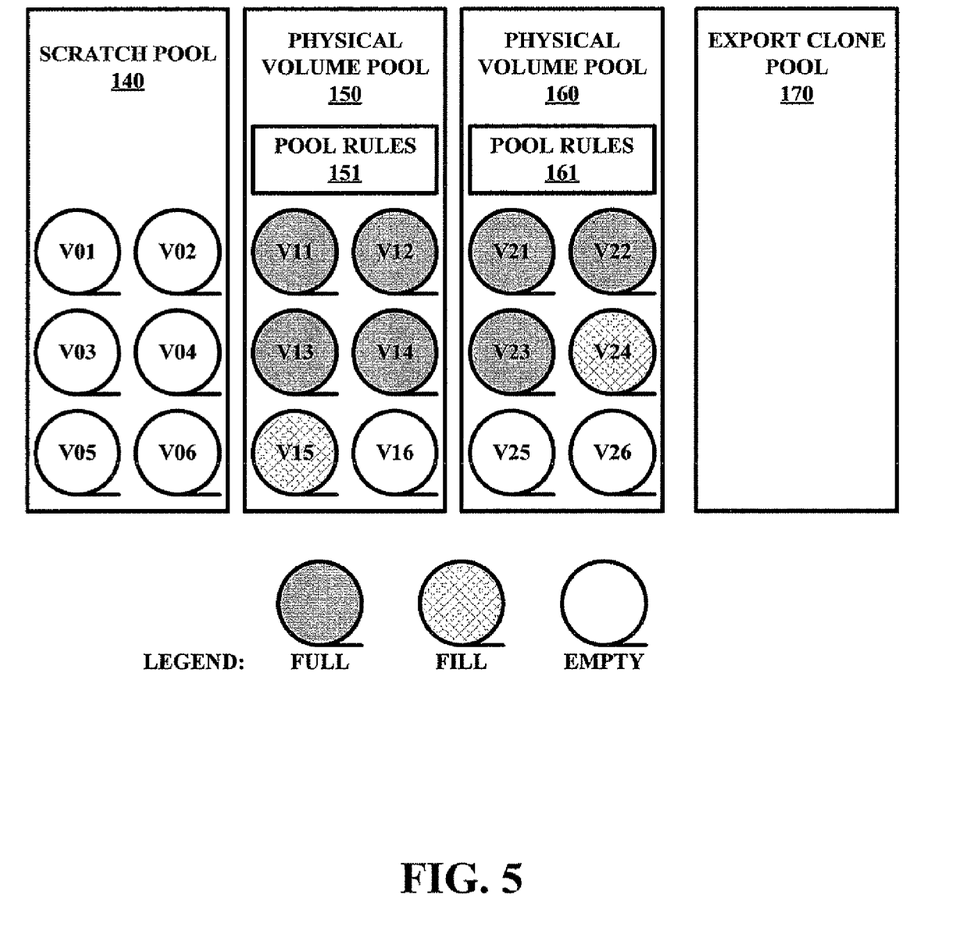
FIGS. 5-9 illustrate exemplary operational states of volume pools illustrated in FIG. 4 in accordance with an execution of the logical volume export method illustrated in FIG. 3.

FIG. 4 illustrates a flowchart 120 representative of the logical volume export method of the present invention that is initiated by virtualization node 100 in response to a host job directed to an export of a set of logical volumes. For purposes of facilitating an understanding of the logical volume export method of the present invention, flowchart 120 is described herein in the context of FIG. 5, which illustrates a scratch pool 140, a physical volume pool 150, a physical volume pool 160, and a deactivated export clone pool 170. Scratch pool 140 has six (6) empty scratch volumes V01-V06. Physical volume pool 150 has pool rules 151, four (4) full physical volumes V11-V14, a partially full physical volume V15 and an empty physical volume V16. Physical volume pool 160 has pool rules 161, three (3) full physical volumes V21-V23, a partially full physical volume V24, and a pair of empty physical volumes V25 and V26. Export clone pool 170 is completely vacant in its deactivated state.

For flowchart 120, physical volumes V21-V24 of physical volume pool 160 will be the export subject of the host job.

As shown in FIG. 4, a stage S122 of flowchart 120 encompasses hierarchical storage node 110 activating export clone pool 170 to clone an identity of source physical volume pool 160 by copying pool rules 161 as pool rules 171 (161) and by moving physical volumes V21-V24 to export clone pool based on a database snapshot of physical volume pool 160 at the time of the export request. Additionally, in anticipation of any new data writes to export clone pool 170 based on the logical volumes contained within physical volumes V21-V24, pair of scratch volumes V05 and V06 are moved from scratch pool 140 to export clone pool 170 as empty physical volumes V35 and V36.

Figure 6:
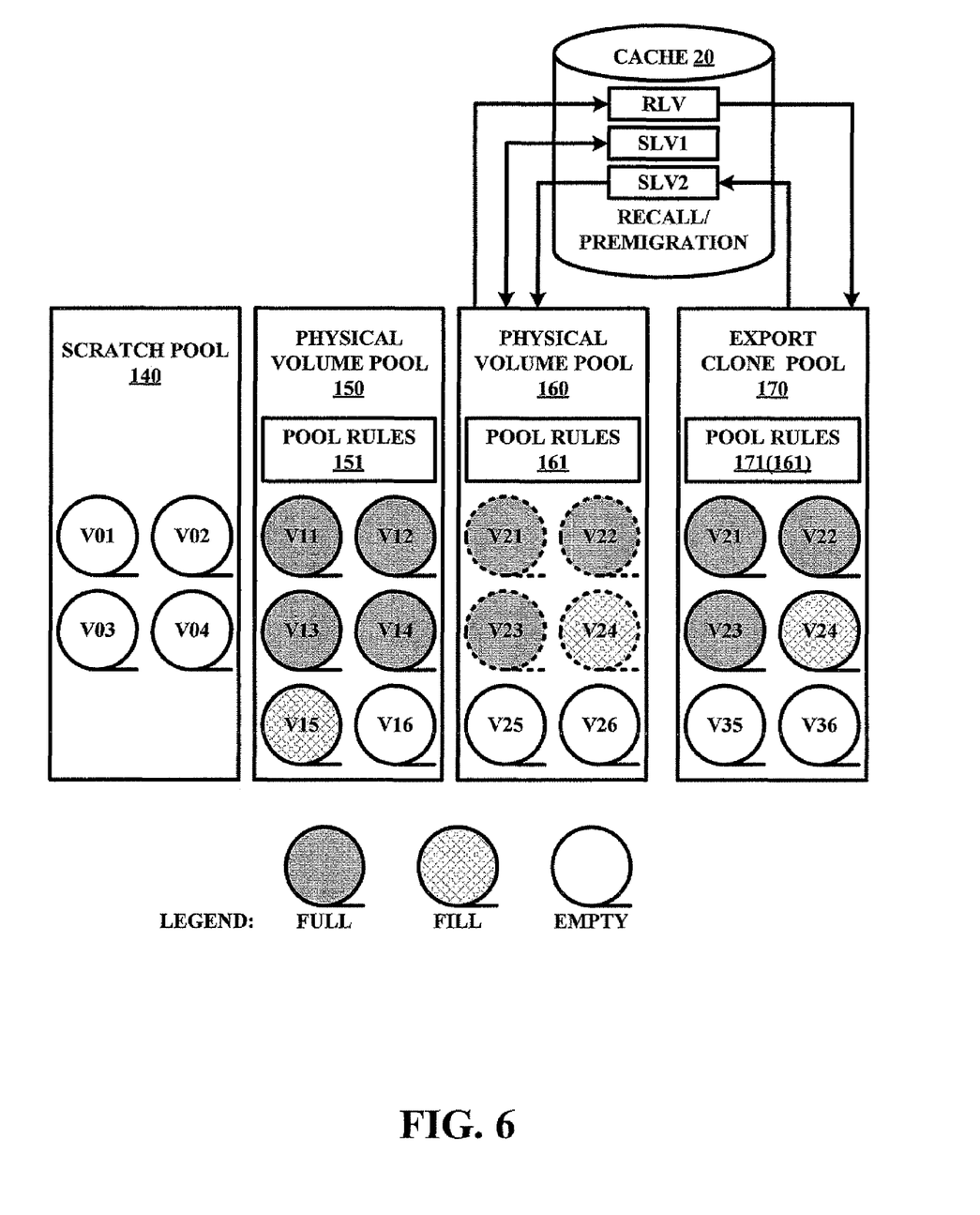

The first procedure involves hierarchical storage node 110 executing a recall of logical volume RLV from physical volumes V21-V24 to cache 20 (FIG. 1) as shown in FIG. 6 whereby each recalled individual logical volume RLV is premigrated from cache 20 to a physical volume of export clone pool 170 (e.g., scratch volume V35 and V36 of export clone pool 170). While this first procedure can be used for any reason, it is primarily appropriate to use this first procedure in response to an individual logical volume being explicitly listed by the host job and being contained within a physical volume among physical volumes V21-V24 that contains a non-zero number of the listed logical volumes where the physical volume has a size or a quantity that is less than a predefined size threshold or a predefined quantity threshold, respectively, as indicated by the snapshot of physical volume pool 160.

The second procedure involves hierarchical storage node 110 executing a database operation for moving physical volumes V21-V24 of source physical volume pool 160 to export clone pool 70. While this second procedure can also be used for any reason, it is primarily appropriate to use this second procedure in response to physical volumes V21-V24 being explicitly listed by the host job and/or physical volumes V21-V24 containing a non-zero number of the listed logical volumes where physical volumes V21-V24 have a size or a quantity that is greater than a predefined size threshold or a predefined quantity threshold, respectively, as indicated by the snapshot of source physical volume pool 160.

In either case, any movement of physical volumes V21-V24 can further involve a removal of any superfluous logical volume SLV1 of physical volumes V21-V24 prior to moving physical volumes V21-V24 to export clone pool 170. As shown in FIG. 6, the removal can be accomplished by a recall of each superfluous logical volume SLV1 of physical volumes V21-V24 from source physical volume pool 160 to cache 20 whereby each recalled superfluous logical volume SLV1 is premigrated back to source physical volume pool 160.

Alternatively, any movement of physical volumes V21-V24 can further involve a return of any superfluous logical volume of the physical volume subsequent to moving physical volumes V21-V24 from source physical volume pool 160 to export clone pool 70. As shown in FIG. 6, the return can be accomplished by a recall of each superfluous logical volume SLV2 of physical volumes V21-V24 from export clone pool 70 to cache 20 whereby each recalled superfluous logical volume SLV2 is premigrated back to source physical volume pool 160.

Stages S124 and S126 of flowchart 120 will be subsequently described herein in the context of physical volumes V21-V24 being moved to export clone pool 170 within a need for recalling and premigrating any logical volumes of physical volumes V21-V24.

Figure 7:
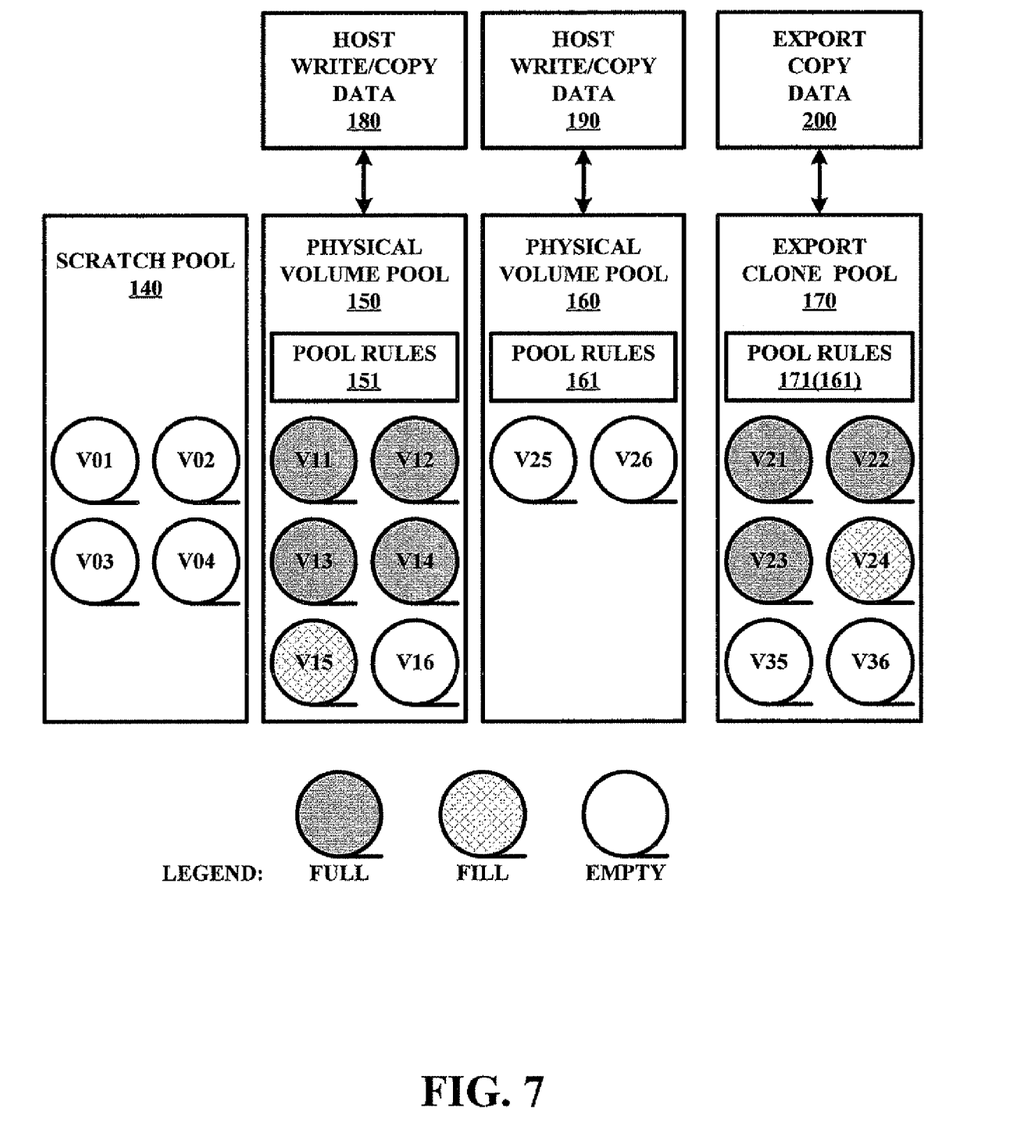

As such, upon updating database 117 (FIG. 3) as needed, stage S124 of flowchart 120 encompasses hierarchical storage node 110 executing an exportation of physical volumes V21-V24 contained within export clone pool 70. As shown in FIG. 7, a pre-export phase of stage S124 involves hierarchical storage node 10 targeting export copy data 200 corresponding to physical volumes V21-V24 and residing in cache 20 prior to the database snapshot of source physical volume pool 160 while still maintaining a host write/copy data 180 to physical volume pool 150 and a host write/copy data 190 to source physical volume pool 160. If required, export data will be written to scratch volumes V35 and V36 and additional scratch volumes will be borrowed from scratch pool 140.

Figure 8:
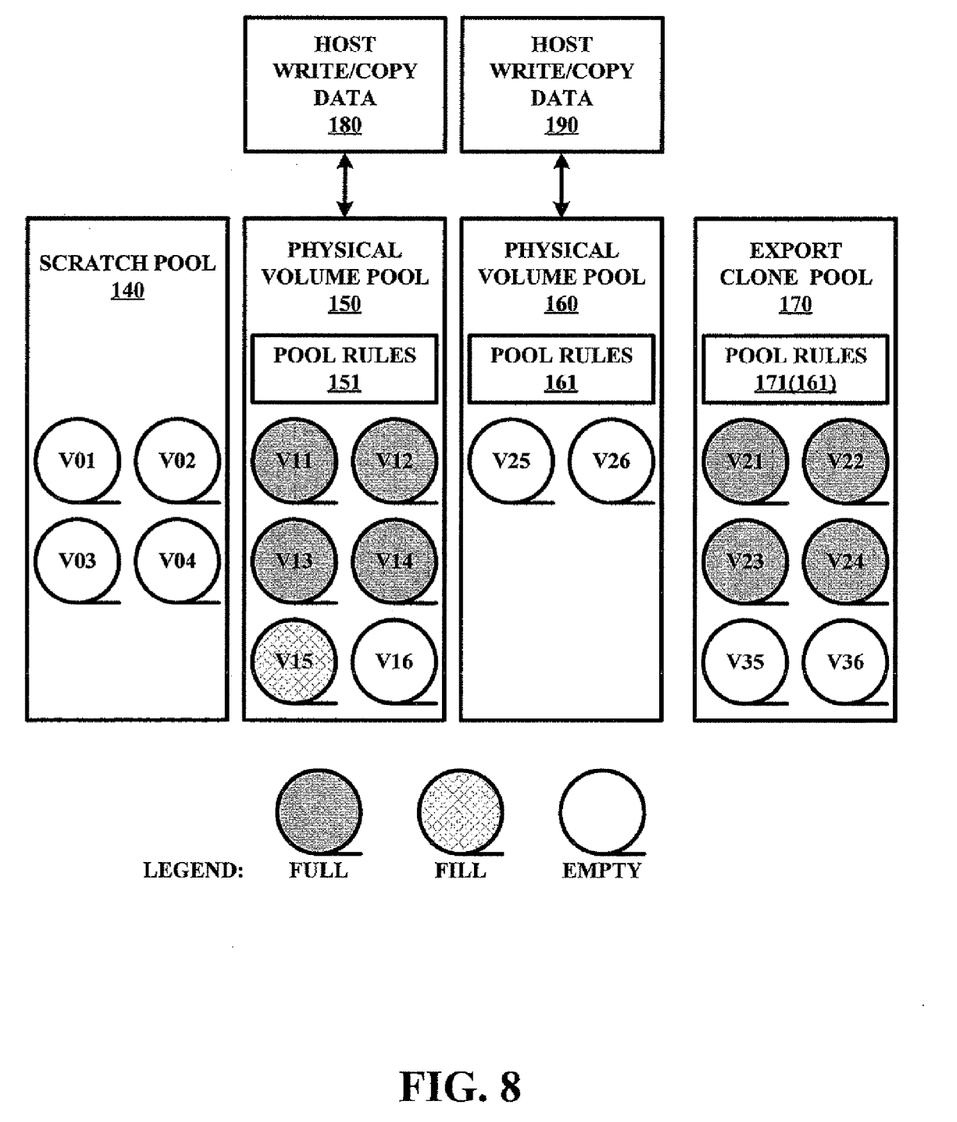

Stage S126 further encompasses hierarchical storage node 110 marking physical volume V24 as full upon completion of export copy data write 200 as shown in FIG. 8, and updating a table of contents of each full physical volume V21-V24 of export clone pool 170 to reflect its contents and any other pertinent information. Stage S126 further includes additional processing steps (not shown) known in the art for exporting physical volumes V21-V24.

Figure 9:
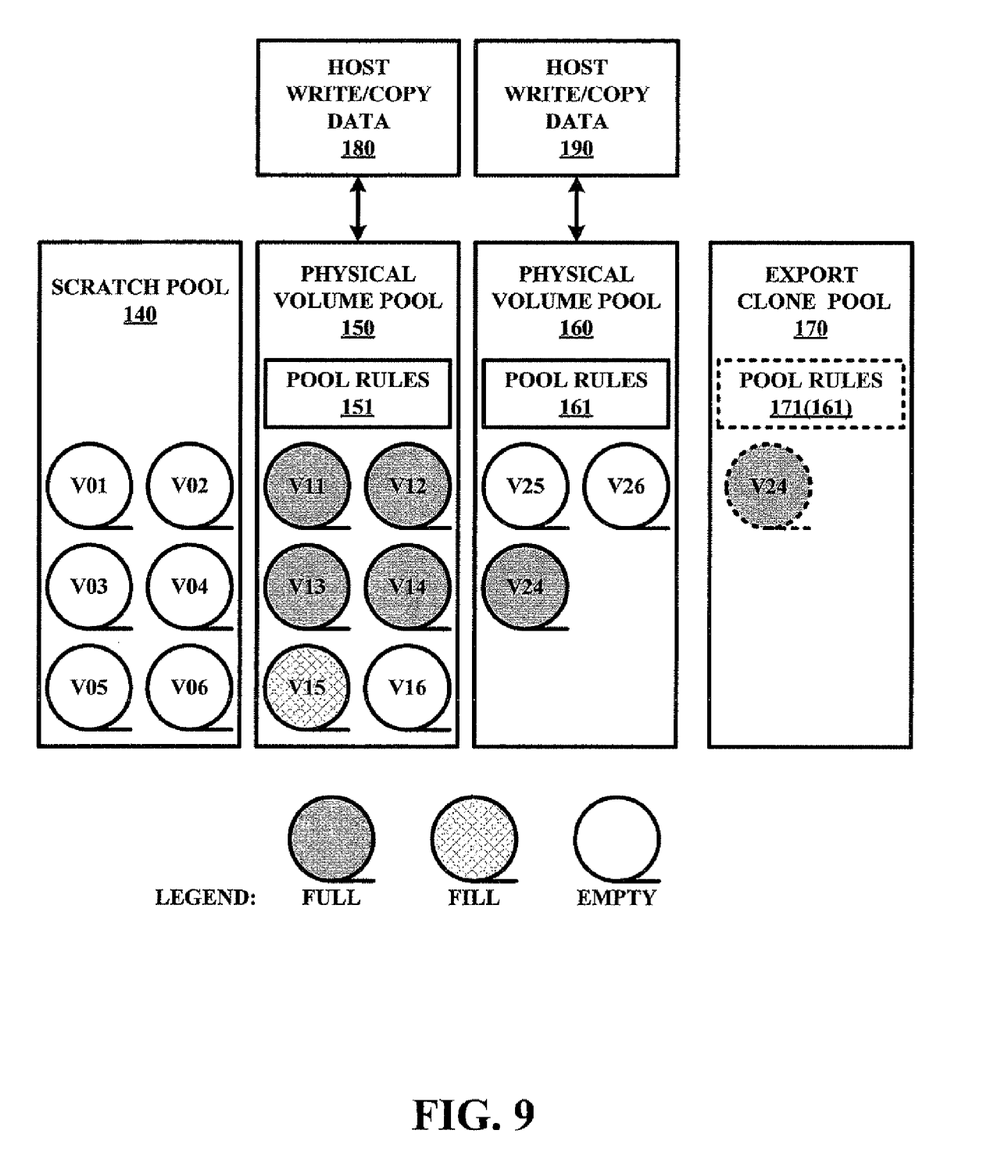

As shown in FIG. 9, upon completion of the export of physical volumes V21-V24, stage S126 of flowchart 120 encompasses hierarchical storage node 110 deactivating export clone pool 170 to purge the identity of source physical volume pool 160 from export clone pool 170 by deleting pool rules 171 (161). In the case of a completion of the export of physical volumes V21-V23 with a failure of exporting physical volume V24, stage S128 would further encompass hierarchical storage node 110 moving failed physical volume V24 back to physical volume pool 160 as shown in FIG. 9.

Referring to FIGS. 1-9, those having ordinary skill in the art will appreciate numerous advantages of the present invention including, but not limited to, an efficient export of logical volumes that timely and completely achieve the export without any interference with writing/copying operation of the VTS and with minimal loss of data. Those having ordinary skill in the art will further recognize that the target VTS the export data is prepared for may be the source VTS or may not be a specific VTS at all, with the target tapes being sent to a secure offline storage location for disaster recovery. Those having ordinary skill in the art will further appreciate how to apply the inventive principles of the present invention to more or less complex storage environments that shown in FIGS. 1-9.

The term "processor" as used herein is broadly defined as one or more processing units of any type for performing all arithmetic and logical operations and for decoding and executing all instructions related to facilitating an implementation by a virtual tape server of the various logical volume export methods of the present invention. Additionally, the term "memory" as used herein is broadly defined as encompassing all storage space in the form of computer readable mediums of any type within the virtual tape server.

Those having ordinary skill in the art of logical volume export techniques may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A computer bearing medium tangibly embodying a program of machine-readable instructions executable by a processor to perform operations, the operations comprising:
   maintaining a source physical volume pool corresponding to a plurality of logical volumes;
   activating an export clone pool to clone an identity of the source physical volume pool into the export clone pool based on at least one logical volume, wherein the source physical volume pool includes at least one pool rule, wherein the activation of the export clone pool to clone the identity of the source physical volume pool into the export clone pool based on the at least one logical volume includes copying the at least one pool rule of the source physical volume pool to the export clone pool, wherein the at least one pool rule indicates a type of storage device being used, wherein the at least one pool rule indicates data borrowing and data return policies, and wherein the export clone pool and the source physical volume pool are maintained in a first computational device;
   exporting, from the first computational device to a second computational device, at least some logical volumes of the plurality of logical volumes of the export clone pool including the at least one logical volume subsequent to the activation of the export clone pool, wherein an attempt to export at least one selected logical volume of the plurality of logical volumes from the export control pool causes a failure, wherein the source physical volume pool is configured to be used by the first computational device while the exporting from the export clone pool to the second computational device is being performed; and
   deactivating the export clone pool to purge the identity of the source physical volume pool from the export clone pool subsequent to the exportation of the export clone pool, and in response to the failure in the export of the at least one selected logical volume from the export control pool, moving the at least one selected logical volume from the export control pool to the source physical volume pool, wherein in response to determining that it is necessary to write export data to scratch volumes and borrow additional scratch volumes from a scratch pool, the export data is written to the scratch volumes and the additional scratch volumes are borrowed from the scratch pool.

2. The computer bearing medium of claim 1,
   wherein the at least one pool rule indicates information to manage a functioning interconnection between the at least one logical volume and a corresponding physical volume contained in the source physical volume pool, and
   wherein the deactivation of the export pool to purge the identity of the source physical volume pool from the export clone pool subsequent to the exportation of the export clone pool includes:
      deleting the least one copied pool rule from the export clone pool.

3. The computer bearing medium of claim 1, wherein the activation of the export pool to clone the identity of the source physical volume pool into the export clone pool based on the at least one logical volume includes:
  individually moving each logical volume of the at least one logical volume from the source physical volume pool to the export clone pool.

4. The computer bearing medium of claim 1,
wherein the source physical volume pool includes at least one physical volume containing the at least one logical volume; and
wherein the activation of the export pool to clone an identity of the source physical volume pool into the export clone pool based on the at least one logical volume includes:
  moving the at least one physical volume from the source physical volume pool to the export clone pool.

5. The computer bearing medium of claim 4, wherein the activation of the export pool to clone the identity of the source physical volume pool into the export clone pool based on the at least one logical volume further includes:
  removing any superfluous logical volume from the at least one physical volume prior to moving the at least one physical volume from the source physical volume pool to the export clone pool.

6. The computer bearing medium of claim 4, wherein the activation of the export pool to clone the identity of the source physical volume pool into the export clone pool based on the at least one logical volume further includes:
  returning any superfluous logical volume of the at least one physical volume from the export clone pool to the source physical volume pool subsequent to moving the at least one physical volume from the source physical volume pool to the export clone pool.

7. The computer bearing medium of claim 1, wherein the exportation of the export clone pool including the at least one logical volume subsequent to the activation of the export clone pool includes:
  prior to exporting the export clone pool, writing any cached data associated with the at least one logical volume to the export clone pool based on the data being cached prior to an activation of the export clone pool.

8. A virtual tape server, comprising:
a processor; and
a memory storing instructions operable with the processor, the instructions executed for:
maintaining a source physical volume pool corresponding to a plurality of logical volumes;
activating an export clone pool to clone an identity of the source physical volume pool into the export clone pool based on at least one logical volume, wherein the source physical volume pool includes at least one pool rule, wherein the activation of the export clone pool to clone the identity of the source physical volume pool into the export clone pool based on the at least one logical volume includes copying the at least one pool rule of the source physical volume pool to the export clone pool, wherein the at least one pool rule indicates a type of storage device being used, wherein the at least one pool rule indicates data borrowing and data return policies, and wherein the export clone pool and the source physical volume pool are maintained in the virtual tape server, wherein the virtual tape server comprises a first computational device;
exporting, from the first computational device to a second computational device, at least some logical volumes of the plurality of logical volumes of the export clone pool including the at least one logical volume subsequent to the activation of the export clone pool, wherein an attempt to export at least one selected logical volume of the plurality of logical volumes from the export control pool causes a failure, wherein the source physical volume pool is configured to be used by the first computational device while the exporting from the export clone pool to the second computational device is being performed; and
deactivating the export clone pool to purge the identity of the source physical volume pool from the export clone pool subsequent to the exportation of the export clone pool, and in response to the failure in the export of the at least one selected logical volume from the export control pool, moving the at least one selected logical volume from the export control pool to the source physical volume pool, wherein in response to determining that it is necessary to write export data to scratch volumes and borrow additional scratch volumes from a scratch pool, the export data is written to the scratch volumes and the additional scratch volumes are borrowed from the scratch pool.

9. The virtual tape server of claim 8,
wherein the at least one pool rule indicates information to manage a functioning interconnection between the at least one logical volume and a corresponding physical volume contained in the source physical volume pool, and
wherein the deactivation of the export pool to purge the identity of the source physical volume pool from the export clone pool subsequent to the exportation of the export clone pool includes:
  deleting the least one copied pool rule from the export clone pool.

10. The virtual tape server of claim 8, wherein the activation of the export pool to clone the identity of the source physical volume pool into the export clone pool based on the at least one logical volume includes:
  individually moving each logical volume of the at least one logical volume from the source physical volume pool to the export clone pool.

11. The virtual tape server of claim 10,
wherein the source physical volume pool includes at least one physical volume having the at least one logical volume; and
wherein the activation of the export pool to clone the identity of the source physical volume pool into the export clone pool based on the at least one logical volume includes:
  moving the at least one physical volume from the source physical volume pool to the export clone pool.

12. The virtual tape server of claim 11, wherein the activation of the export pool to clone the identity of the source physical volume pool into the export clone pool based on the at least one logical volume further includes:
  removing any superfluous logical volume from at least one physical volume prior to moving the at least one physical volume from the source physical volume pool to the export clone pool.

13. The virtual tape server of claim 10, wherein the activation of the export pool to clone the identity of the source physical volume pool into the export clone pool based on the at least one logical volume further includes:
  returning any superfluous logical volume of the at least one physical volume from the export clone pool to the source physical volume pool subsequent to moving the at least one physical volume from the source physical volume pool to the export clone pool.

14. The virtual tape server of claim 8, wherein the exportation of the export clone pool including the at least one logical volume subsequent to the activation of the export clone pool:
   writing any cached data associated with the at least one logical volume to the export clone pool based on the data being cached prior to an activation of the export clone pool.

15. A method, comprising:
   maintaining a source physical volume pool corresponding to a plurality of logical volumes;
   activating an export clone pool to clone an identity of the source physical volume pool into the export clone pool based on at least one logical volume, wherein the source physical volume pool includes at least one pool rule, wherein the activation of the export clone pool to clone the identity of the source physical volume pool into the export clone pool based on the at least one logical volume includes copying the at least one pool rule of the source physical volume pool to the export clone pool, wherein the at least one pool rule indicates a type of storage device being used, wherein the at least one pool rule indicates data borrowing and data return policies, and wherein the export clone pool and the source physical volume pool are maintained in a first computational device;
   exporting, from the first computational device to a second computational device, at least some logical volumes of the plurality of logical volumes of the export clone pool including the at least one logical volume subsequent to the activation of the export clone pool, wherein an attempt to export at least one selected logical volume of the plurality of logical volumes from the export control pool causes a failure, wherein the source physical volume pool is configured to be used by the first computational device while the exporting from the export clone pool to the second computational device is being performed; and
   deactivating the export pool to purge the identity of the source physical volume pool from the export clone pool subsequent to the exportation of the export clone pool, and in response to the failure in the export of the at least one selected logical volume from the export control pool, moving the at least one selected logical volume from the export control pool to the source physical volume pool, wherein in response to determining that it is necessary to write export data to scratch volumes and borrow additional scratch volumes from a scratch pool, the export data is written to the scratch volumes and the additional scratch volumes are borrowed from the scratch pool.

16. The method of claim 15,
   wherein the at least one pool rule indicates information to manage a functioning interconnection between the at least one logical volume and a corresponding physical volume contained in the source physical volume pool, and
   wherein the deactivation of the export pool to purge the identity of the source physical volume pool from the export clone pool subsequent to the exportation of the export clone pool includes:
      deleting the least one copied pool rule from the export clone pool.

17. The method of claim 15, wherein the activation of the export pool to clone an identity of the source physical volume pool into the export clone pool based on the at least one logical volume includes:
   individually moving each logical volume of the at least one logical volume from the source physical volume pool to the export clone pool.

18. The method of claim 17,
   wherein the source physical volume pool includes at least one physical volume having the at least one logical volume; and
   wherein the activation of the export pool to clone the identity of the source physical volume pool into the export clone pool based on the at least one logical volume includes:
      moving the at least one physical volume from the source physical volume pool to the export clone pool.

19. The method of claim 18, wherein the activation of the export pool to clone the identity of the source physical volume pool into the export clone pool based on the at least one logical volume further includes:
   removing any superfluous logical volume from at least one physical volume prior to moving the at least one physical volume from the source physical volume pool to the export clone pool.

20. The method of claim 17, wherein the activation of the export pool to clone the identity of the source physical volume pool into the export clone pool based on the at least one logical volume further includes:
   returning any superfluous logical volume of the at least one physical volume from the export clone pool to the source physical volume pool subsequent to moving the at least one physical volume from the source physical volume pool to the export clone pool.

21. The method of claim 15, wherein the exportation of the export clone pool including the at least one logical volume subsequent to the activation of the export clone pool:
   writing any cached data associated with the at least one logical volume to the export clone pool based on the data being cached prior to an activation of the export clone pool.

* * * * *